(12) United States Patent
Wang

(10) Patent No.: US 11,025,856 B2
(45) Date of Patent: Jun. 1, 2021

(54) EMERGENCY ALARM CONTROL CIRCUIT AND ELECTRONIC DEVICE USING THE EMERGENCY ALARM CONTROL CIRCUIT

(71) Applicant: Realtek Semiconductor Corp., HsinChu (TW)

(72) Inventor: Chi-Te Wang, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/658,136

(22) Filed: Oct. 20, 2019

(65) Prior Publication Data

US 2021/0120205 A1 Apr. 22, 2021

(51) Int. Cl.
| | |
|---|---|
| *H04N 5/63* | (2006.01) |
| *G08B 5/22* | (2006.01) |
| *G08B 21/10* | (2006.01) |
| *H04N 5/50* | (2006.01) |

(52) U.S. Cl.
CPC ............ *H04N 5/63* (2013.01); *G08B 5/22* (2013.01); *G08B 21/10* (2013.01); *H04N 5/50* (2013.01)

(58) Field of Classification Search
CPC ... H04N 5/63; H04N 5/50; G08B 5/22; G08B 21/10; G08B 1/08; G08B 13/00; G08B 13/1445; G08B 13/19654; G08B 13/19682; G08B 13/19697; G08B 15/001; G08B 17/00; G08B 17/02; G08B 17/04; G08B 17/06; G08B 17/10; G08B 19/00; G08B 19/005; G08B 19/02; G08B 21/00; G08B 21/02; G08B 21/0216; G08B 21/0297; G08B 21/06; G08B 21/12; G08B 21/24; G08B 23/00; G08B 25/00; G08B 25/001; G08B 25/008; G08B 29/00; G08B 29/02; G08B 29/12; G08B 29/16; G08B 31/00
USPC .................. 348/730; 725/108, 33; 340/693.2
See application file for complete search history.

(56) References Cited

U.S. PATENT DOCUMENTS

| | | | | |
|---|---|---|---|---|
| 5,175,441 | A * | 12/1992 | den Hollander | H04N 5/63 307/43 |
| 6,191,504 | B1 * | 2/2001 | Kawata | H02J 9/005 307/125 |
| 2005/0166221 | A1 * | 7/2005 | Pugel | H04H 60/13 725/33 |
| 2006/0005219 | A1 * | 1/2006 | Owens | H04N 21/4436 725/33 |
| 2016/0192033 | A1 * | 6/2016 | Kitahara | H04N 21/615 725/33 |

* cited by examiner

*Primary Examiner* — John W Miller
*Assistant Examiner* — Omer Khalid
(74) *Attorney, Agent, or Firm* — Winston Hsu

(57) ABSTRACT

An emergency alarm control circuit comprising: a processing circuit; and an emergency decoder, coupled to the processing circuit. The processing circuit is active, the emergency decoder is non-active when the emergency alarm control circuit operates in a standby mode. The processing circuit activates the emergency decoder to detect an emergency message for an active time period at least one time in the standby mode, and de-activates the emergency decoder when the emergency decoder does not receive the emergency message in the standby mode. The emergency alarm control circuit switches to an active mode when the emergency decoder receives the emergency message in the standby mode, and the processing circuit controls an emergency alarm system to generate an emergency alarm in the active mode.

19 Claims, 5 Drawing Sheets

EMERGENCY ALARM CONTROL CIRCUIT AND ELECTRONIC DEVICE USING THE EMERGENCY ALARM CONTROL CIRCUIT

BACKGROUND OF THE INVENTION

1. Field of the Invention

The present invention relates to an emergency alarm control circuit and an electronic device using the emergency alarm control circuit, and particularly relates an emergency alarm control circuit and an electronic device using the emergency alarm control circuit which has low power consumptions.

2. Description of the Prior Art

Sudden natural disasters can cause considerable damages. Therefore, some countries require home appliances to have an emergency alarm generating function to notify the public immediately when a natural disaster occurs or is about to occur.

For example, a TV may follow the ATSC (Advanced Television Systems Committee) 3.0 Emergency Alarm Standard to broadcast emergency alarms. However, such TV consumes more power since many components therein must be activated in order to broadcast emergency alarms, even when the TV is turned off.

SUMMARY OF THE INVENTION

Therefore, one objective of the present invention is to provide an emergency alarm control circuit which can reduce power consumption.

Another objective of the present invention is to provide an electronic device which can generate emergency alarms and has low power consumption.

One embodiment of the present invention is to provide an emergency alarm control circuit comprising: a processing circuit; and an emergency decoder, coupled to the processing circuit. The processing circuit is active, the emergency decoder is non-active when the emergency alarm control circuit operates in a standby mode. The processing circuit activates the emergency decoder to detect an emergency message for an active time period at least one time in the standby mode, and de-activates the emergency decoder when the emergency decoder does not receive the emergency message in the standby mode. The emergency alarm control circuit switches to an active mode when the emergency decoder receives the emergency message in the standby mode, and the processing circuit controls an emergency alarm system to generate an emergency alarm in the active mode.

Another embodiment of the present invention provides an electronic device using the emergency alarm control circuit. The electronic device comprises the above-mentioned emergency alarm system and a processor. The processing circuit awakes the processor to control the emergency alarm system to generate an emergency alarm in the active mode.

In view of above-mentioned embodiments, an emergency alarm control circuit which can provide low power consumption is provided, thus different power consumption requirements of different countries can be met.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided to explain the concept of the present invention. Please note, the components of each embodiment can be implemented by hardware (e.g. circuit, device) or firmware (e.g. a processor installed with at least one program). Also, the components in each embodiment can be integrated to fewer components, or be divided to more components.

Figure 1:
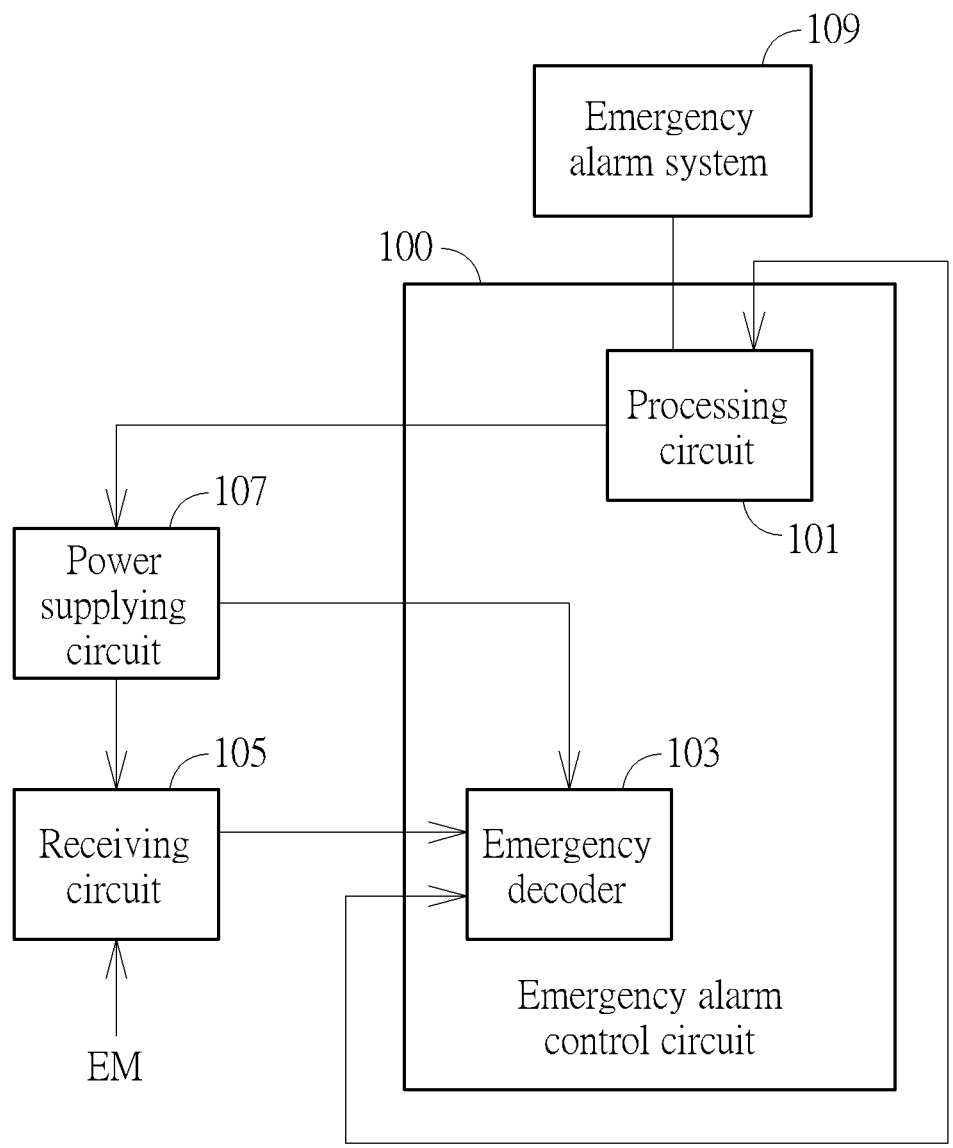
FIG. 1 is a block diagram illustrating an emergency alarm control circuit according to one embodiment of the present invention.

FIG. 1 is a block diagram illustrating an emergency alarm control circuit 100 according to one embodiment of the present invention. As illustrated in FIG. 1, the emergency alarm control circuit 100 comprises a processing circuit 101 and an emergency decoder 103. The processing circuit 101 is coupled to the emergency decoder 103, a power supplying circuit 107 and an emergency alarm system 109. Also, the emergency decoder 103 is coupled to a receiving circuit 105. The power supplying circuit 107 and the receiving circuit 105 can be the components included in the electronic device comprising the emergency alarm system 100. For example, in one embodiment the emergency alarm control circuit 100 is applied to a TV. In such case, the emergency alarm system 109 is a display of the TV, the power supplying circuit 107 is a power circuit of the TV, and the receiving circuit 105 is a tuner of the TV. Such tuner can also be applied to process TV program data. However, in another embodiment, the receiving circuit 105 and/or the power supplying circuit 107 can be included in the emergency alarm control circuit 100. Further, the receiving circuit 105 can be other kinds of receiving circuits. For example, the receiving circuit 105 can comprise an antenna to receive the emergency message EM, which is transmitted via broadcasting.

The emergency alarm control circuit 100 can operate in at least two modes: a standby mode or an active mode. The electronic device comprising the emergency alarm system 109 also operates in a standby mode or a non-active mode when the emergency alarm control circuit 100 operates in the standby mode. In the standby mode, the processing circuit 101 is active, and the emergency decoder 103, the receiving circuit 105, and the power supplying circuit 107 are non-active. The processing circuit 101 activates the emergency decoder 103, the receiving circuit 105 and the power supplying circuit 107 to detect the emergency message EM for an active time period (e.g. 1 us) at least one time in the standby mode. Also, the processing circuit 101 de-activates the emergency decoder 103, the receiving circuit 105 and the power supplying circuit 107 when the emergency decoder 103 does not receive the emergency message EM in the end of the active time period in the standby mode. In one embodiment, the processing circuit 101 activates the emergency decoder 103 and/or the receiving circuit 105 to detect the emergency message EM for the active time period every predetermined time cycle (e.g. several seconds or milliseconds) in the standby mode. By adjusting the active time period and the predetermined time cycle, the power consumption of emergency alarm control circuit 100 in the standby mode can be controlled to meet different requirements. The emergency message EM can be a message generated by a government department, to trigger the electronic device comprising emergency alarm control circuit 100 to generate emergency alarms.

The emergency alarm control circuit 101 switches to the active mode when the emergency decoder 103 receives the emergency message EM in the standby mode, and the processing circuit 101 controls the emergency alarm system 109 to generate at least one emergency alarm in the active mode. The emergency alarm system 109 can be, for example, a display of a TV, such that the emergency alarm can be warning messages displayed on the display. Alternatively, the emergency alarm system 109 can be a speaker of an audible alarm device such as a fire alarm device, such that emergency alarm can be audible alarms broadcasted by the speaker.

In one embodiment, the emergency decoder 103 stores emergency information, and generates a trigger signal to trigger the processing circuit 101 to control the emergency alarm system 109 to generate the emergency alarm according to the emergency information in the active mode. The emergency information can comprise, for example, the contents of the emergency alarm, or the parameters which the processing circuit 101 can use to control the emergency alarm system 109 to generate the emergency alarms. In such case, the above-mentioned emergency message EM can be a trigger command, to trigger the emergency decoder 103 to generate the trigger signal.

In one embodiment, the processing circuit 101 activates the emergency decoder 103 and the receiving circuit 105 via controlling the power supplying circuit 107 to be active or non-active. For more detail, if the processing circuit 101 activates the power supplying circuit 107, the power supplying circuit 107 provides power to the emergency decoder 103 and the receiving circuit 105, thus the emergency decoder 103 and the receiving circuit 105 operate in a state which can be activated or directly be activated. In one embodiment, the processing circuit 101 first activates the power supplying circuit 107 to provide power to the emergency decoder 103 and the receiving circuit 105 and then provides another command to activate the emergency decoder 103 in the active mode.

In view of above-mentioned descriptions, the operations of the emergency alarm control circuit 100 can be summarized as follows: In the standby mode, only the processing circuit 101 is active, other components such as the emergency decoder 103, the receiving circuit 105 and the power supplying circuit 107 are non-active. The processing circuit 101 activates the emergency decoder 103 to detect the emergency message EM at least one time in the standby mode. The emergency alarm control circuit 100 switches to the active mode if the emergency decoder 103 receives the emergency message EM in the standby mode. In the active mode, the processing circuit 101 activates the emergency decoder 103, the receiving circuit 105 and the power supplying circuit 107. Also, the processing circuit 101 controls the emergency alarm system 109 to generate emergency alarms according to emergency information stored in the emergency decoder 103.

However, please note, the operations of the emergency alarm control circuit 100 are not limited to above-mentioned examples. For example, in one embodiment, the power providing circuit 107 is active but the emergency decoder 103, the receiving circuit 105 are non-active in the standby mode. In such case, the power providing circuit 107 still provide power to the emergency decoder 103 and the receiving circuit 105, but the emergency decoder 103 and the receiving circuit 105 have no function. Therefore, in such case, the processing circuit 101 generates commands to activate the emergency decoder 103 and the receiving circuit 105 rather than activate the emergency decoder 103 and the receiving circuit 105 via controlling the power supplying circuit 107. Therefore, persons skilled in the art can understand the emergency alarm control circuit 100 may have various operations to reach the same functions. Such variation should also fall in the scope of the present application.

Figure 2:
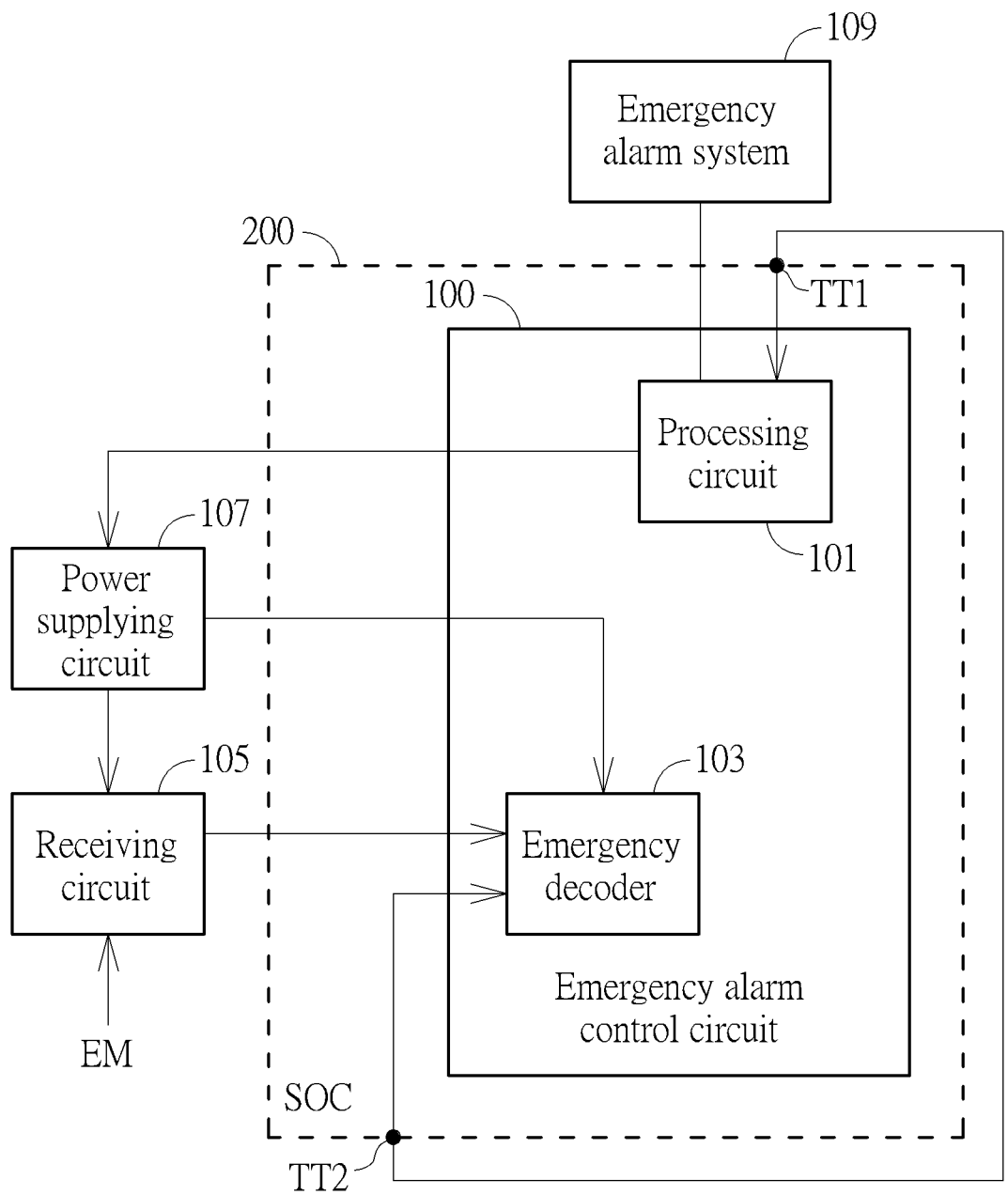
FIG. 2 is a block diagram illustrating an emergency alarm control circuit according to another embodiment of the present invention.

FIG. 2 is a block diagram illustrating an emergency alarm control circuit according to another embodiment of the present invention. In this embodiment, the emergency alarm control circuit 100 is provided in a SOC (system on chip) 200, thus the processing circuit 101 and the emergency decoder 103 are located in the SOC 200. Also, the receiving circuit 105 and the power circuit 107 are provided outside the SOC 200. As above-mentioned, the receiving circuit 105 or the power circuit 107 can be included in the emergency alarm control circuit 100. Therefore, in one embodiment, the receiving circuit 105 and/or the power circuit 107 is also located in the SOC 200. In view of above-mentioned descriptions, the receiving circuit 105 and/or the power providing circuit 107 are non-active in the standby mode, thus only few power is needed to activate the processing circuit 101 and to temporarily activate the emergency decoder 103. Therefore, the power consumption can be reduced. For example, the power consumption can be less than 0.5 watt in the standby mode.

Further, in the embodiment of FIG. 2, the SOC 200 comprises a transceiving terminal TT1 and a transceiving terminal TT2. The transceiving terminal TT1 and TT2 are capable of transmitting and receiving signals, and can be any type of transceiving interface, such as a GPIO interface. In the standby mode, the transceiving terminal TT1 operates as a transmitting terminal and the transceiving terminal TT2 operates as a receiving terminal, thereby the processing circuit 101 can generate a signal to activate the emergency decoder 103. Also, in the active mode, the transceiving terminal TT1 operates as a receiving terminal and the transceiving terminal TT2 operates as a transmitting terminal, thereby the processing circuit 101 can receive emergency information stored in the emergency decoder 103 to control the emergency alarm system 109.

Figure 3:
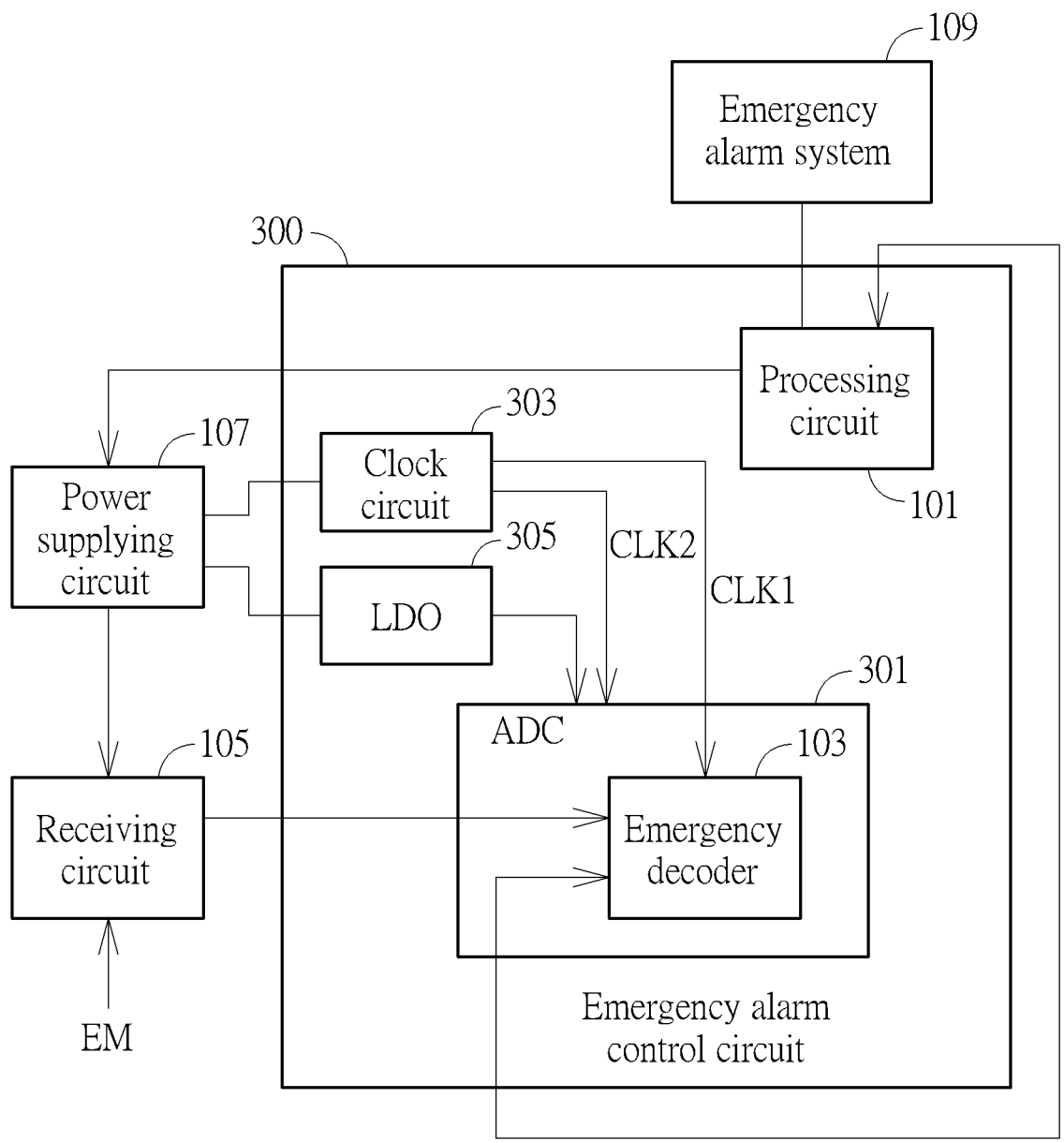
FIG. 3 is a block diagram illustrating an emergency alarm control circuit according to still another embodiment of the present invention.

FIG. 3 is a block diagram illustrating an emergency alarm control circuit according to still another embodiment of the present invention. In this embodiment, besides the components illustrated in FIG. 1, the emergency alarm control circuit 300 further comprises an ADC (analog to digital converter) 301, a clock circuit 303 and an LDO (Low Dropout Regulator) 305. The emergency decoder 103 is included in the ADC 301, thus the processing circuit 101 activates or de-activates the emergency decoder 103 via activating or de-activating the ADC 301. In other words, the ADC 301 is non-activate in the standby mode and is activated by the processing circuit 101 at least one time in the standby mode, thereby the emergency decoder 103 can detect the emergency message EM.

In one embodiment, the processing circuit 101 activates the emergency decoder 103 and the ADC 301 to detect the emergency message EM for the active time period at least one time in the standby mode, and de-activates the emergency decoder 103 and the ADC 301 when the emergency decoder 103 does not receive the emergency message EM in the end of the active time period in the standby mode. Also, in on embodiment, the ADC 301 and the emergency decoder 103 operate in an identical power domain. That is, the operating voltages of the ADC 301 and the emergency decoder 103 are the same (e.g. 3.3v).

Besides, the clock circuit 303 such as a crystal oscillator circuit is configured to provide operating clocks CLK1 and CLK2 respectively to the ADC 301 and the emergency decoder 103, thereby the ADC 301 and the emergency decoder 103 can operate at proper frequencies. The LDO 305 is configured to reduce the voltage from the power providing circuit 107, thereby the ADC 301 can operate at a proper voltage level.

Figure 4:
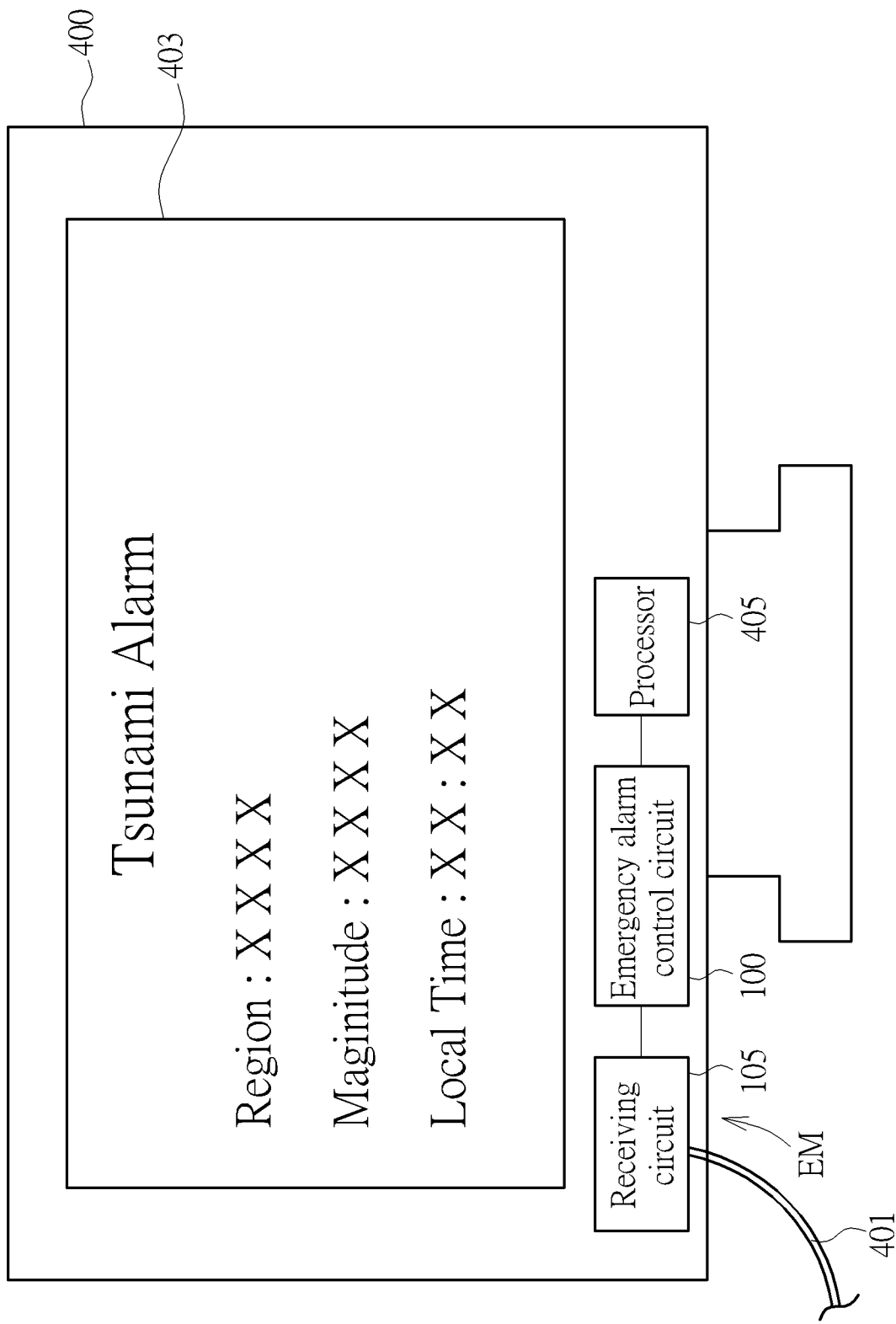
FIG. 4 is a schematic diagram illustrating a TV comprising the emergency alarm control circuit according to one embodiment of the present invention.

FIG. 4 is a schematic diagram illustrating a TV comprising the emergency alarm control circuit according to one embodiment of the present invention. As illustrated in FIG. 4, the emergency alarm control circuit 100 is provided in a TV 400, and the receiving circuit 105 is a tuner of the TV 400. In such case, if the emergency alarm control circuit 100 receives an emergency message EM, for example, from a TV cable 401, the processing circuit 101 of the emergency alarm control circuit 100 controls the display 403 to display the emergency alarm. If the TV 400 is in a sleep mode, the processing circuit 101 awakes a processor 405 of the TV 400 to control the TV 400 to display the emergency alarm. In one embodiment, the processing circuit 101 is integrated to the processor 405. In this embodiment, the emergency alarm is a tsunami alarm. Please note, the embodiments in FIG. 1, FIG. 2 and FIG. 3 all can be applied to the embodiment shown in FIG. 4.

Figure 5:
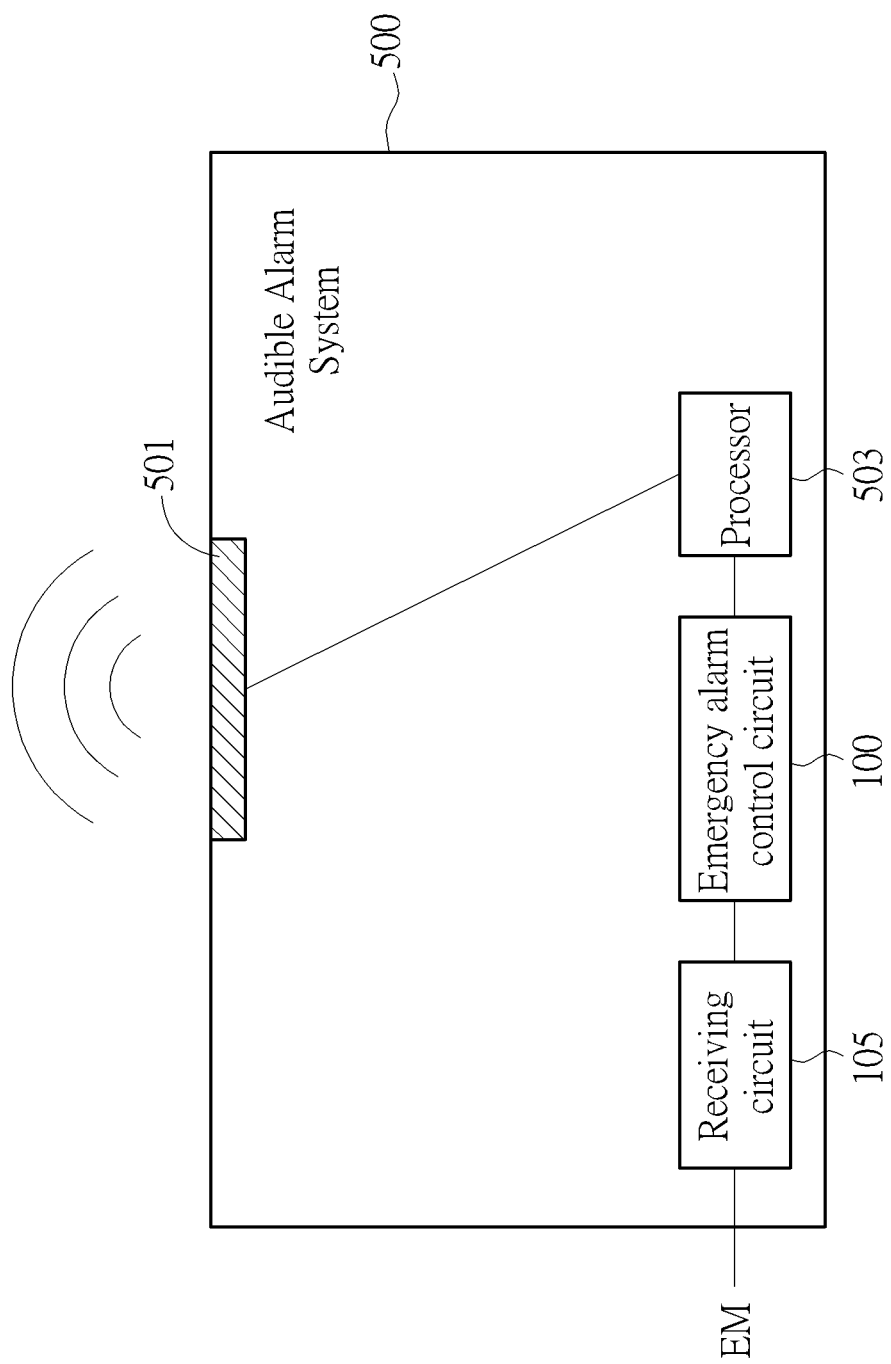
FIG. 5 is a schematic diagram illustrating an audible alarm system comprising the emergency alarm control circuit according to one embodiment of the present invention.

FIG. 5 is a schematic diagram illustrating an audible alarm system comprising the emergency alarm control circuit according to one embodiment of the present invention. As illustrated in FIG. 5, the emergency alarm control circuit 100 is provided in an audible alarm system 500, and the receiving circuit 105 can be an antenna of the audible alarm system 500. In such case, if the emergency alarm control circuit 100 receives an emergency message EM, for example, from the antenna, the processing circuit 101 of the emergency alarm control circuit 100 controls the speaker 501 to broadcast the emergency alarm. If the audible alarm system 500 is in a sleep mode, the processing circuit 101 awakes a processor 503 of the audible alarm system 500 to control the speaker 501 to display the emergency alarm. In one embodiment, the processing circuit 101 can be integrated to the processor 503. Also, the embodiments in FIG. 1, FIG. 2 and FIG. 3 all can be applied to the embodiment shown in FIG. 5.

In view of above-mentioned embodiments, an emergency alarm control circuit which can provide low power consumption is provided, thus different power consumption requirements of different countries can be met.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An emergency alarm control circuit, comprising:
a processing circuit; and
an emergency decoder, coupled to the processing circuit;
wherein the processing circuit is active, the emergency decoder is non-active when the emergency alarm control circuit operates in a standby mode;
wherein the processing circuit activates the emergency decoder to detect an emergency message for an active time period at least one time in the standby mode, and de-activates the emergency decoder to be non-active when the emergency decoder does not receive the emergency message in the standby mode, wherein the emergency decoder is not able to receive the emergency message while being non-active;
wherein the emergency alarm control circuit switches to an active mode when the emergency decoder receives the emergency message in the standby mode, and the processing circuit controls an emergency alarm system to generate an emergency alarm in the active mode;
wherein the emergency alarm control circuit further comprises a power supplying circuit coupled to the emergency decoder, the processing circuit, wherein the power supplying circuit is non-active and does not provide power in the standby mode, wherein the processing circuit first activates the power supplying circuit and then activates the emergency decoder in the active mode.

2. The emergency alarm control circuit of claim 1, wherein the processing circuit activates the emergency decoder to detect the emergency message for the active time period every predetermined time cycle in the standby mode.

3. The emergency alarm control circuit of claim 1, wherein the processing circuit and the emergency decoder are located in a SOC (System on a Chip), and the power supplying circuit is located outside the SOC.

4. The emergency alarm control circuit of claim 1, wherein the emergency decoder stores emergency information, and generates a trigger signal to trigger the processing circuit to control the emergency alarm system to generate the emergency alarm according to the emergency information in the active mode.

5. The emergency alarm control circuit of claim 1,
further comprising an ADC (analog to digital converter);
wherein the emergency decoder is comprised in the ADC and the ADC is non-activate in the standby mode;
wherein the processing circuit activates the emergency decoder, and the ADC to detect the emergency message for the active time period at least one time in the standby mode, and de-activates the emergency decoder and the ADC when the emergency decoder does not receive the emergency message in the standby mode.

6. The emergency alarm control circuit of claim 5, wherein the ADC and the emergency decoder operate in an identical power domain.

7. The emergency alarm control circuit of claim 1,
further comprising a receiving circuit configured to receive the emergency message,
wherein the processing circuit is active, the receiving circuit and the emergency decoder are non-active when the emergency alarm control circuit operates in a standby mode;
wherein the processing circuit activates the emergency decoder and the receiving circuit to detect the emergency message for the active time period at least one time in the standby mode, and de-activates the emergency decoder and the receiving circuit such that the receiving circuit and the emergency decoder are non-active when the emergency decoder does not receive the emergency message in the standby mode;

wherein the receiving circuit could not receive any signal while being non-active.

8. The emergency alarm control circuit of claim 7, wherein the processing circuit and the emergency decoder are located in a SOC (System on a Chip), and the receiving circuit is located outside the SOC.

9. The emergency alarm control circuit of claim 7, wherein the emergency alarm system is a display of a television, and the receiving circuit is a tuner of the TV.

10. An electronic device capable of generating emergency alarms, comprising:
an emergency alarm generating system;
a processor; and
an emergency alarm control circuit, comprising:
  a processing circuit; and
  an emergency decoder, coupled to the processing circuit;
wherein the processing circuit is active, the emergency decoder is non-active when the emergency alarm control circuit operates in a standby mode;
wherein the processing circuit activates the emergency decoder to detect an emergency message for an active time period at least one time in the standby mode, and de-activates the emergency decoder to be non-active when the emergency decoder does not receive the emergency message in the standby mode, wherein the emergency decoder is not able to receive the emergency message while being non-active;
wherein the emergency alarm control circuit switches to an active mode when the emergency decoder receives the emergency message in the standby mode, and the processing circuit awakes the processor to control the emergency alarm generating system to generate an emergency alarm in the active mode;
wherein the electronic device further comprises a power supplying circuit coupled to the emergency decoder, the processing circuit, wherein the power supplying circuit is non-active and does not provide power in the standby mode, wherein the processing circuit first activates the power supplying circuit and then activates the emergency decoder in the active mode.

11. The electronic device of claim 10, wherein the processing circuit activates the emergency decoder to detect the emergency message for the active time period every predetermined time cycle in the standby mode.

12. The electronic device of claim 10, wherein the processing circuit and the emergency decoder are located in a SOC (System on a Chip), and the power supplying circuit is located outside the SOC.

13. The electronic device of claim 10, wherein the emergency decoder stores emergency information, and generates a trigger signal to trigger the processing circuit to control the emergency alarm system to generate the emergency alarm according to the emergency information in the active mode.

14. The electronic device of claim 10,
further comprising an ADC (analog to digital converter);
wherein the emergency decoder is comprised in the ADC and the ADC is non-activate in the standby mode;
wherein the processing circuit activates the emergency decoder, and the ADC to detect the emergency message for the active time period at least one time in the standby mode, and de-activates the emergency decoder and the ADC when the emergency decoder does not receive the emergency message in the standby mode.

15. The electronic device of claim 14, wherein the ADC and the emergency decoder operate in an identical power domain.

16. The electronic device of claim 10,
further comprising a receiving circuit configured to receive the emergency message,
wherein the processing circuit is active, the receiving circuit and the emergency decoder are non-active when the emergency alarm control circuit operates in a standby mode;
wherein the processing circuit activates the emergency decoder and the receiving circuit to detect the emergency message for the active time period at least one time in the standby mode, and de-activates the emergency decoder and the receiving circuit such that the receiving circuit and the emergency decoder are non-active when the emergency decoder does not receive the emergency message in the standby mode;
wherein the receiving circuit could not receive any signal while being non-active.

17. The electronic device of claim 16, wherein the processing circuit and the emergency decoder are located in a SOC (System on a Chip), and the receiving circuit is located outside the SOC.

18. The electronic device of claim 16, wherein the electronic device is a TV, the emergency alarm system is a display, and the receiving circuit is a tuner.

19. An emergency alarm control circuit, comprising:
a processing circuit; and
an emergency decoder, coupled to the processing circuit;
wherein the processing circuit is active, the emergency decoder is non-active when the emergency alarm control circuit operates in a standby mode;
wherein the processing circuit activates the emergency decoder to detect an emergency message for an active time period at least one time in the standby mode, and de-activates the emergency decoder to be non-active when the emergency decoder does not receive the emergency message in the standby mode, wherein the emergency decoder is not able to receive the emergency message while being non-active;
wherein the emergency alarm control circuit switches to an active mode when the emergency decoder receives the emergency message in the standby mode, and the processing circuit controls an emergency alarm system to generate an emergency alarm in the active mode;
wherein the emergency alarm control circuit further comprises an ADC (analog to digital converter);
wherein the emergency decoder is comprised in the ADC and the ADC is non-activate in the standby mode;
wherein the processing circuit activates the emergency decoder, and the ADC to detect the emergency message for the active time period at least one time in the standby mode, and de-activates the emergency decoder and the ADC when the emergency decoder does not receive the emergency message in the standby mode.

* * * * *